United States Patent
Malone et al.

(10) Patent No.: US 9,471,940 B2
(45) Date of Patent: Oct. 18, 2016

(54) REAL-TIME SELF-SERVICE TERMINAL (SST) NETWORK AWARENESS

(71) Applicants: David Eric Malone, Cumming, GA (US); Ricky Alvin Lane, II, Atlanta, GA (US)

(72) Inventors: David Eric Malone, Cumming, GA (US); Ricky Alvin Lane, II, Atlanta, GA (US)

(73) Assignee: NCR CORPORATION, Duluth, GA (US)

( * ) Notice: Subject to any disclaimer, the term of this patent is extended or adjusted under 35 U.S.C. 154(b) by 0 days.

(21) Appl. No.: 14/555,034

(22) Filed: Nov. 26, 2014

(65) Prior Publication Data

US 2016/0148308 A1   May 26, 2016

(51) Int. Cl.
*G07F 19/00* (2006.01)
*G06Q 40/02* (2012.01)
*G06Q 20/18* (2012.01)
*H04W 4/12* (2009.01)
*H04W 4/02* (2009.01)

(52) U.S. Cl.
CPC .............. *G06Q 40/02* (2013.01); *G06Q 20/18* (2013.01); *H04W 4/021* (2013.01); *H04W 4/12* (2013.01)

(58) Field of Classification Search
USPC ................................... 235/379, 381; 705/43
See application file for complete search history.

(56) References Cited

U.S. PATENT DOCUMENTS

| | | | |
|---|---|---|---|
| 7,209,891 B1* | 4/2007 | Addy | G06Q 20/20 705/16 |
| 8,161,330 B1* | 4/2012 | Vannatter | G07F 9/026 235/380 |
| 2004/0124966 A1* | 7/2004 | Forrest | G06Q 20/32 340/5.8 |
| 2009/0299800 A1* | 12/2009 | Neilan | G06Q 10/06 705/7.26 |
| 2011/0054677 A1* | 3/2011 | Liddell | G06Q 10/06 700/236 |
| 2015/0001289 A1* | 1/2015 | Smith | G06Q 20/3278 235/379 |
| 2015/0074179 A1* | 3/2015 | Graw | G07F 19/201 709/203 |

* cited by examiner

*Primary Examiner* — Ahshik Kim
(74) *Attorney, Agent, or Firm* — Schwegman, Lundberg & Woessner

(57) ABSTRACT

Operational data and metrics from a Self-Service Terminal (SST) network are continuously acquired in a first format at a server. The first format is normalized and delivered to a configured mobile application on a mobile device. The mobile application selectively renders the operational awareness data/metrics for the SST network within one or more screens of a display on the mobile device. The operator of the mobile application can define views of the data/metrics, define alerts or notifications to propagate, and interact with the data/metrics to obtain more or less detail for that data/metrics.

20 Claims, 4 Drawing Sheets

REAL-TIME SELF-SERVICE TERMINAL (SST) NETWORK AWARENESS

BACKGROUND

Managing an Automated Teller Machine (ATM) network is challenging for branch managers and service providers. This is so because a variety of services exists to provide management information but such services require a specific interface and login credentials to a website. Learning the interfaces from different service providers and finding a terminal with a screen large enough to support a quality review of the information provided by each of the services providers through a browser are time consuming if not impractical exercises.

Additionally, some managers or service providers may have to subscribe to multiple different services because the level of detail provided by one provider may be better than another provider while still another provider may provide different data types or data views that the managers or service providers prefer. This creates even more complication and difficulty for the managers and service providers in quickly ascertaining the health and needs of the ATM networks that they manage.

Moreover, the individuals that need to have real time operational information associated with ATM networks do not have the necessary time to dig through and analyze minute details associated with the networks. These individuals want to have the information pushed to them in a format that is easily understood, consistent, easily visible on a display of a device that they are using, and that can be integrated across different ATM networks that are being managed.

Therefore, there is a need to provide improved terminal network metrics for network managers and service providers in a more timely, consistent, and easily understood manner.

SUMMARY

In various embodiments, methods and a system for providing real-time Self-Service Terminal (SST) network awareness information are presented.

According to an embodiment, a method for providing real-time SST network awareness information is presented.

Specifically, data is obtained from a Self-Service Terminal (SST) network repository. Next, the data is reformatted in a mobile-device compatible format for delivery to a mobile device.

DETAILED DESCRIPTION

Figure 1:
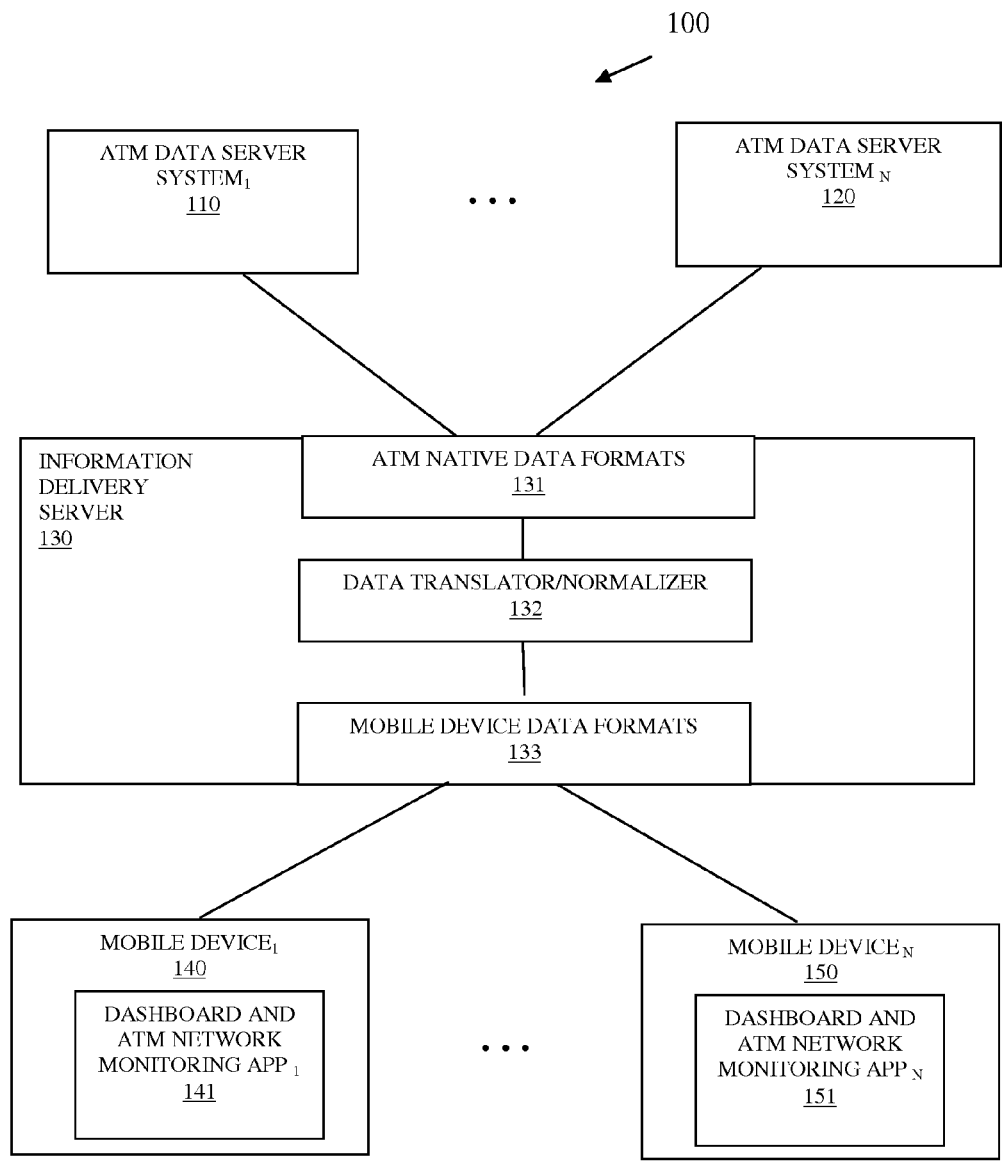
FIG. 1 is a diagram of a real-time Self-Service Terminal (SST) network awareness information delivery system, according to an example embodiment.

FIG. 1 is a diagram of a real-time Self-Service Terminal (SST) network awareness information delivery system 100, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of providing real-time SST network awareness information, presented herein and below.

The real-time SST network awareness information delivery system 100 includes multiple ATM data server systems 110 and 120, an information delivery server 130, and multiple mobile devices 140 and 150. The information delivery server includes ATM native data formats 131, a data translator/normalizer 132, and mobile device data formats 133. Each mobile device (140 or 150) includes a dashboard and ATM network monitoring app (application) (141 or 151).

The ATM data server systems 110 and 120 are each connected to one or more ATM networks. Each ATM data server system 110 or 120 collects real-time data for the ATMs within its managed ATM network. Such data can include, by way of example only, ATM identifiers, ATM network identifiers, ATM resource status identifiers (ink levels in receipt printers, currency total and currency denominations available for dispensing, etc.), ATM or ATM network profitability metrics, transaction totals, failed transactions, transaction load, transaction volume, incident metrics (servicing trips, failures of peripherals, failures of transactions, etc.).

The data housed in each of the ATM data server systems 110 or 120 is organized and accessible through its own data formats, data types, reporting interface, and/or query interface. In an embodiment, the data format and interface of the ATM data server system 110 is different from and, perhaps, incompatible with that which is associated with the ATM data server system 120.

Information delivery server 130 includes interfaces and information pulling from each of the ATM data server systems through the ATM native data formats module 131. That is, the ATM native data formats module 131 utilizes an interface for accessing data and metrics in real time or near-real time from the ATM data server system 110 and, in some cases, a different interface for accessing data and metrics in real time or near-real time from the ATM data service system 120.

Once the data and metrics are obtained, the data and metrics are provided as input to the data translator/normalizer 132. Here, the data format and the data types obtained from the ATM data server systems 110 and 120 are translated and/or normalized into a standard format accessible from a standard interface. Once the data and the metrics are normalized, the normalized data and metrics are passed to the mobile device data formats module 133.

The mobile device data formats module 133 includes a variety of interfaces for interacting with, pushing information to (information the normalized data and metrics), and handling requests for specific types of data from the mobile devices 140 and 150 through those devices' dashboard and ATM network monitoring apps 141 and 151.

The description of the dashboard and ATM network monitoring apps 141 and 151 is presented for just app 141; it is noted that this is being done for improved readability and that which applies to app 141 applies to app 151 as well.

The app 141 includes a dashboard service for the mobile device 140 that permits some aspects of the data from one or more of the ATM data server systems 110 to be continuously displayed and updated in real time on the mobile device 140. The dashboard service is rendered on a screen within the display of the mobile device 140. It is noted that the types of real time data or information presented by the dashboard service can be configured by an operator of the mobile device 140 interacting with an interface associated with the app 141. Moreover, the location of the dashboard information or the screen with the display of the mobile device 140 can be configured by the operator of the mobile device 140 using the interface associated with the app 141. The interface may also be used by the operator of the mobile device 140 to request specific types of data or information from one or more of the ATM server systems 110 and/or 120.

The app 141 also directly interfaces with a standard interface of the mobile device data formats module 133 of the information delivery server 130 to communicate operated initiated requests for data/information relevant to the dashboard service and/or any operator on-demand requests for specific data/information.

The app 141 may temporarily hold a variety of supporting data/information acquired from the mobile device data formats module 133 in storage and/or cache of the mobile device 140.

The interface provided to the operator of the mobile device 140 by the app 141 may be responsive to selections of data made by the user from the screen having the dashboard service. This permits the operator to drill down into underlying supporting data for a specific dashboard presented data or metric item or even change the view or level of detail presented within the screen for that data or metric item. Additionally, the interface provided to the operator may permit the operator to decrease the level of detail to a higher more general view through interaction with the interface. In this way, the operator can drill down into metric and data items for more fine grain detail, or the operator can aggregated up a current level of detail associated with a selected metric or data item to obtain a coarse-grain level of detail.

In this way, an operator of mobile device 140 can obtain real-time or near real-time data/information relevant to one or more ATM data server systems 110 and 120.

Once the dashboard service is configured by an operator of the mobile device 140, the app 141 communicates to a normalized interface associated with the mobile device data formats module 133 a desired configuration of data and metric items for a specific ATM server system 110 or from multiple ATM server systems 110 and 120. The interface of the mobile device data formats module 133 then communicates (perhaps through different interfaces) with the data translator/normalizer module 132. The data translator/normalizer module 132 formats the requests for data or metrics and communicates with the ATM native formats module 131. The ATM native formats module 131 selects the appropriate interface or Application Programming Interface (API) calls to pull the desired data from the needed ATM data server system 110 and/or 120.

Moreover, the modules 131-133 continuously operate to periodically keep pulling the requested data and metrics and delivering the updated data and metrics to the app 141 where the presentation of the data and metrics are continuously updated in real time or near-real time.

At any time, the operator of the mobile device 140 is free to access the interface of the app 141 to remove data items or metrics from the presentation of data and metrics associated with the dashboard service. Moreover, the operator can at any time use the interface of the app 141 to add new data and/or metrics or make a specific request for data or a report.

In an embodiment, the data passed between the mobile device data formats module 133 and the app 141 is in a Java™ Script Object Notation (JSON). Thus, when new data associated with new data types is added to the ATM data server systems 110, this can be delivered to the app 141 and presented to the user to ask if the user is interested in such new data for presentation with the dashboard services. So, new data and new data types can be dynamically added and integrated for presentation within the mobile device 140. In some cases, the JSON is dropped as a service on the mobile device 140 to automatically pull the new data to the mobile device 140. The mobile device data formats module 133 provides the JSON modules to the mobile device 140.

In an embodiment, the app 141 resolves a current physical or geographical location for the mobile device 140 and uses this along with ATM network identifiers and/or ATM identifiers to provide geographical context to the operator of the mobile device 140, such as the geographical location of the operator of the mobile device 140 relative to a specific ATM or network of ATMs.

Other customizable geographical context/overlay views can be presented on a screen of the display of the mobile device via the app 141, such as a map with a location of each ATM and/or ATM network and when a specific network or ATM is selected by the user data or metrics relevant and configured for that network of ATMs or that ATM is presented as a popup menu.

The interface of the app 141 may also permit the user to define alerts and notifications that are automatically pushed to social media and/or email to users that have a stake in the ATM networks. Still further, the operator of the mobile device 140 can use the interface of the app 141 to manually initiate an alert or notification. So, the operator can be proactive in an automated manner or manual manner to alert stakeholders via social media, text messages, and/or email of situations occurring within the ATM networks that are of interest to those stakeholders.

Essentially, the views on operational ATM network data, the alerts, and the notifications can be customized, defined, and managed by the operator of the mobile device 140 through the interface to the app 141. This gives proactive, dynamic, and real time or near real-time operational awareness of and control of the ATM networks to the operator of the mobile device 140.

Some of embodiments of the FIG. 1 and other embodiments are now discussed with reference to the FIGS. 2-4.

Figure 2:
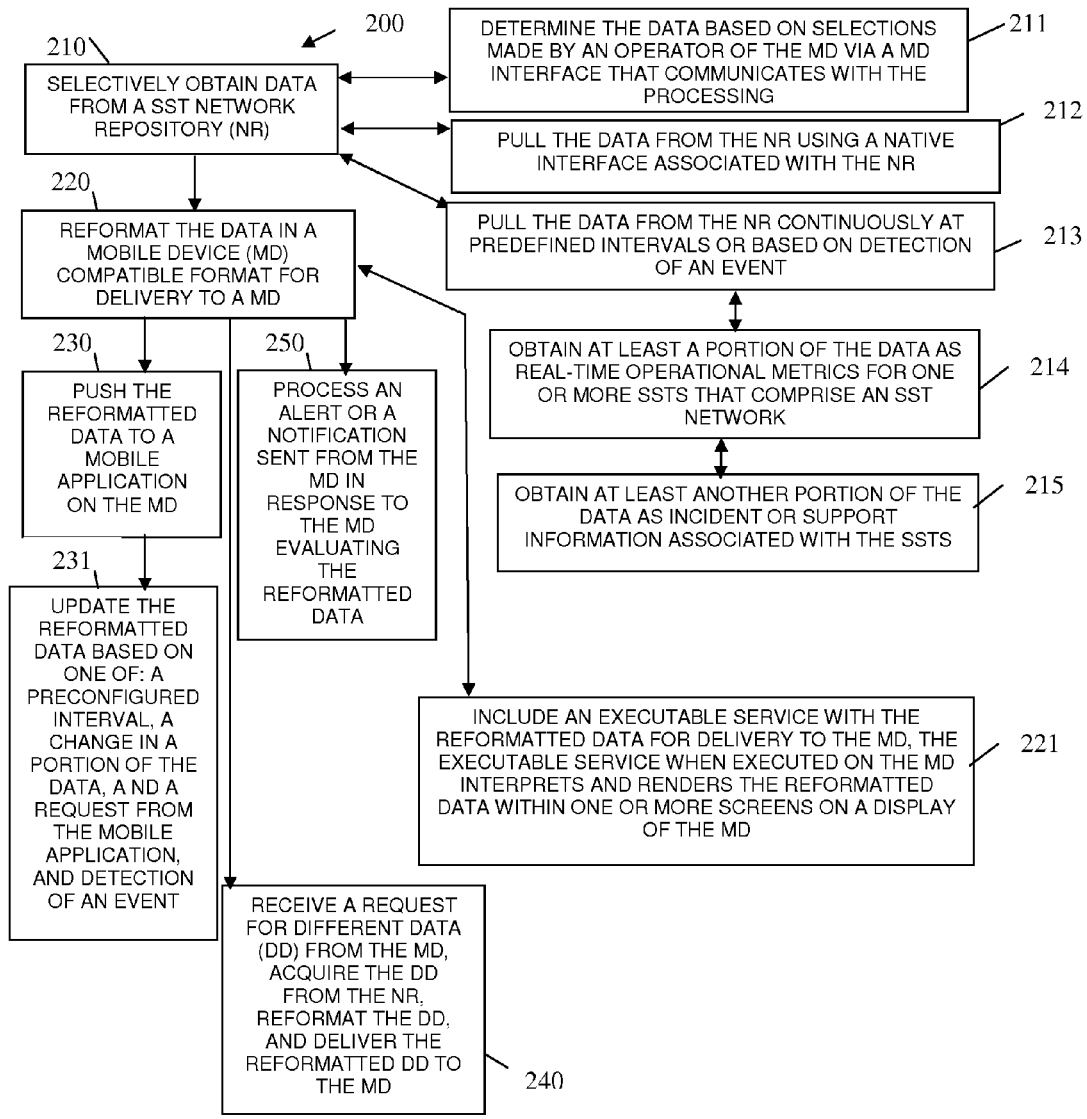
FIG. 2 is a diagram of a method for providing real-time SST network awareness information, according to an example embodiment.

FIG. 2 is a diagram of a method 200 for providing real-time SST network awareness information, according to an example embodiment. The software module(s) that implements the method 200 is referred to as a "SST network information manager." The SST network information manager is implemented as executable instructions programmed and residing within memory and/or a non-transitory computer-readable (processor-readable) storage medium and executed by one or more processors of a device. The processor(s) of the device that executes the SST network information manager are specifically configured and programmed to process the local device SST network information manager. The SST network information manager has access to one or more network connections during its processing. The network connections can be wired, wireless, or a combination of wired and wireless.

In an embodiment, the SST network information manager is one or more of the modules 131, 132, and 133 of the FIG. 1.

In an embodiment, the SST network information manager is executed on the information delivery server 130 of the FIG. 1.

In an embodiment, the device that executes the SST network information manager is a part of a cloud-based processing environment.

In an embodiment, the device that executes the SST network information manager is part of a retail establishment.

In an embodiment, the device that executes the SST network information manager is part of a financial institution.

In an embodiment, the device that executes the SST network information manager is a Local-Area Network (LAN) server.

In an embodiment, the device that executes the SST network information manager is a Wide-Area Network (WAN) server.

At 210, the SST network information manager selectively obtains data from an SST network repository. In an embodiment, the SST network repository is one of the ATM data server systems 110 or 120 of the FIG. 1.

According to an embodiment, at 211, the SST network information manager determines based on selections made by an operator of the mobile device through a mobile device interface that communicates with the SST network information manager. So, the selections are driven by a mobile device operator, such as a manager of an enterprise, an executive an enterprise, an administrator, and/or support staff associated with maintaining an SST network.

In an embodiment, at 212, the SST network information manager pulls the data from the SST network repository using a native interface or native API associated with the SST network repository.

In an embodiment, at 213, the SST network information manager pulls the data from the SST network repository continuously at predefined intervals or based on detection of an event (such as a change in a portion of the data).

In an embodiment of 213 and at 214, the SST network information manager obtains at least a portion of the data as real-time operational metrics for the one or more SSTs that comprise an SST network that the SST network repository gathers data for.

In an embodiment of 214 and at 215, the SST network information manager obtains at least another portion of the data as incident or support information associated with the SSTs.

At 220, the SST network information manager reformats the data in a mobile device compatible format for delivery to a mobile device. This was discussed at length above with the discussion of the FIG. 1.

According to an embodiment, at 230, the SST network information manager pushes the reformatted data to a mobile application on the mobile device. In an embodiment the mobile application is one of the dashboard and ATM network monitoring app 141 or 151 of the FIG. 1.

In an embodiment of 230 and at 231, the SST network information manager updates the reformatted data based on one of: a preconfigured interval of time, a change in a portion of the data, a specific request from the mobile application, and automatic detection of a configured event.

In an embodiment, at 240, the SST network information manager receives a request for different data from the mobile device, acquires the different data from the SST network repository, reformats the different data, and delivers the reformatted different data to the mobile device.

In an embodiment, at 250, the SST network information manager processes an alert or a notification sent from the mobile device in response to the mobile device that evaluates the reformatted data. Processing may include taking an automated action or forwarding the alert or the notification to one or more predefined entities.

Figure 3:
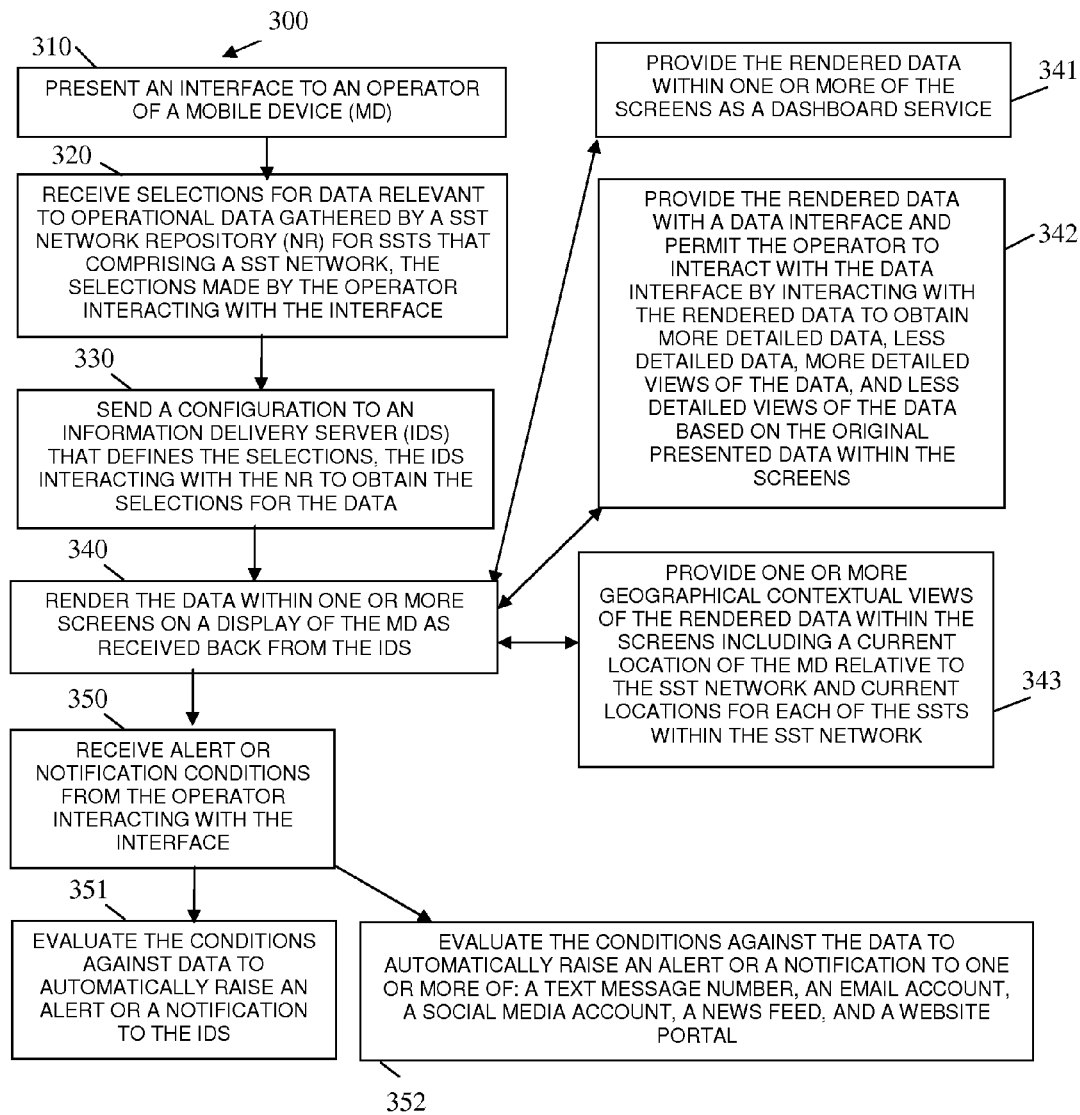
FIG. 3 is a diagram of another method for providing real-time SST network awareness information, according to an example embodiment.

FIG. 3 is a diagram of another method 300 for providing real-time SST network awareness information, according to an example embodiment. The software module(s) that implements the method 300 is referred to as a "SST network information application (app)." The SST network information app is implemented as executable instructions programmed and residing within memory and/or a non-transitory computer-readable (processor-readable) storage medium and executed by one or more processors of a device. The processors that execute the SST network information app are specifically configured and programmed to process the SST network information app. The SST network information app has access to one or more network connections during its processing. The network connections can be wired, wireless, or a combination of wired and wireless.

In an embodiment, the device that executes the SST network information app is the mobile device 140 or 150 of the FIG. 1.

In an embodiment, the device that executes the SST network information app is one of: a mobile phone, a tablet, a laptop, and a wearable processing device.

In an embodiment, the SST network information app is the dashboard and ATM network monitoring app 141 or 151 of the FIG. 1.

The SST network information app interacts with the method 200 of the FIG. 2 to provide real-time or near real-time SST network management information, alerts, and/or notifications to an operator of a mobile device that executes the SST network information app.

At 310, the SST network information app presents an interface to an operator of a mobile device.

At 320, the SST network information app receives selections for data that is relevant to operational awareness data gathered by an SST network repository for SSTs that comprise an SST network. The selections made by the operator that interacts with the interface on the mobile device.

At 330, the SST network information app sends a configuration to an information delivery server that defines the selections for the data. The information delivery server interacts with the SST network repository to obtain the selections for the data.

At 340, the SST network information app renders the data within one or more screens on a display of the mobile device as received back from the information delivery server.

According to an embodiment, at 341, the SST network information app provides the rendered data within one or more of the screens as a dashboard service. In an embodiment, the dashboard service is the dashboard service discussed above with the FIG. 1.

In an embodiment, at 342, the SST network information app provides the rendered data with a data interface and permits the operator to interact with the data interface by interacting with the rendered data to obtain more detailed data, less detailed data, more detailed views of the data, and less detailed views of the data based on the original presented data within the screens.

In an embodiment, at 343, the SST network information app provides one or more geographical contextual views of the rendered data within the screens including a current location of the mobile device relative to the SST network and current locations for each of the SSTs within the SST network. In an embodiment, the geographical contextual views are presented as interactive geographical maps.

According to an embodiment, at 350, the SST network information app receives alert or notification conditions from the operator interacting with the interface.

In an embodiment of 350 and at 351, the SST network information app evaluates conditions against the data to automatically raise an alert or a notification to the information delivery server.

In an embodiment of 350 and at 360, the SST network information app evaluates the conditions against the data to automatically raise an alert or a notification to one or more of: a text message number, an email account, a social media account, a news feed, and a website portal.

Figure 4:
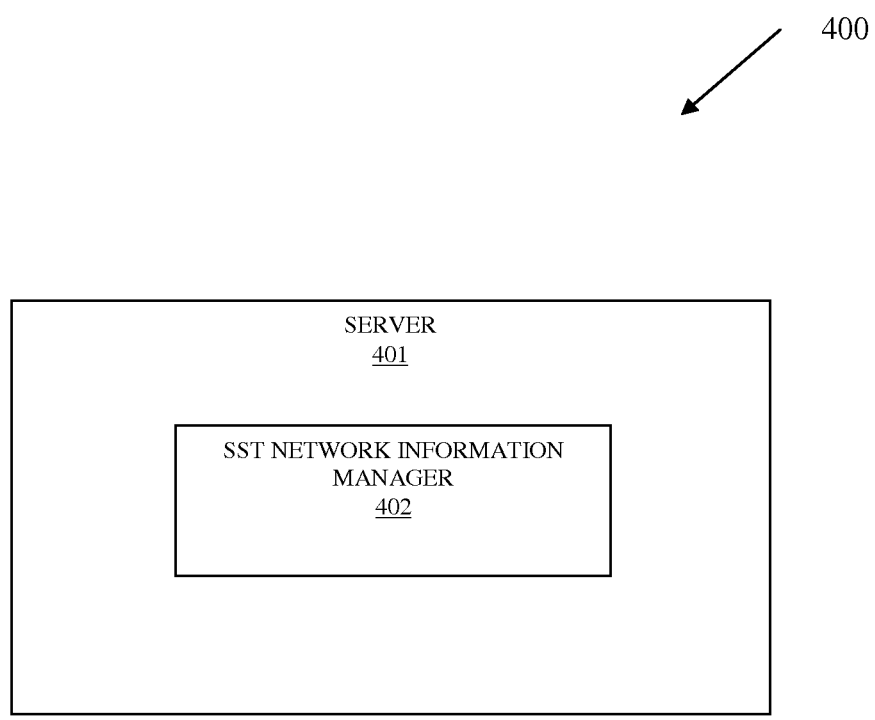
FIG. 4 is a diagram of a real-time SST network awareness information system, according to an example embodiment.

FIG. 4 is a diagram of a real-time SST network awareness information system 400, according to an example embodiment. The real-time SST network awareness information system 400 includes a variety of hardware components and software components. The software components of the real-time SST network awareness information system 400 are programmed and reside within memory and/or a non-transitory computer-readable medium and execute on one or more processors of the real-time SST network awareness information system 400. The real-time SST network awareness information system 400 communicates over one or more networks, which can be wired, wireless, or a combination of wired and wireless.

In an embodiment, the real-time SST network awareness information system 400 implements, inter alia, the processing discussed above with the FIG. 1.

In an embodiment, the real-time SST network awareness information system 400 implements, inter alia, the processing discussed above with the FIG. 2.

In an embodiment, the real-time SST network awareness information system 400 implements, inter alia, the processing discussed above with the FIG. 3.

The real-time SST network awareness information system 400 includes a server 401 and an SST network information manager 402.

In an embodiment, the server 401 is part of a cloud processing environment.

In an embodiment the server 401 is part of a financial institution's processing environment.

In an embodiment, the server 401 is the information delivery server 130 of the FIG. 1.

The server 401 includes one or more processors, memory, non-volatile storage, and one or more network connections (wired, wireless, or a combination of wired and wireless).

In an embodiment, the SSTs associated with the SST network being managed are kiosks.

In an embodiment, the SSTs associated with the SST network being managed are ATMs.

In an embodiment, the SSTs associated with the SST network being managed are self-service Point-Of-Sale (POS) devices.

In an embodiment, the SSTs associated with the SST network are combinations of kiosks, ATMs, and self-service POS devices.

The SST network information manager 402 is adapted and configured to: execute on the server 401, obtain SST operational data from a native SST network repository, and deliver selective portions of the operational data to a mobile device in real time or near real time.

In an embodiment, the SST network information manager 402 is one or more of the modules 131, 132, and 133 of the FIG. 1.

In an embodiment, the SST network information manager 402 is the method 200 of the FIG. 2.

According to an embodiment, the SST network information manager 402 is further adapted and configured to process an alert or a notification provided by the mobile device in response to the selective portions of the operational data.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   selectively obtaining data from a Self-Service Terminal (SST) network repository that houses SST specific data and SST specific data formats; and
   reformatting the data in a mobile-device compatible format for delivery to a mobile device as defined by an operator of the mobile device and to screen locations within a display of the mobile device as defined by the operator.

2. The method of claim 1 further comprising, pushing the reformatted data to a mobile application on the mobile device.

3. The method of claim 2, wherein pushing further includes updating the reformatted data based on one of: a preconfigured interval, a change detected in a portion of the data, a request from the mobile application, and detection of an event.

4. The method of claim 1, further comprising, receiving a request for different data from the mobile device, acquiring the different data from the SST network repository, reformatting the different data, and delivering the reformatted different data to the mobile device.

5. The method of claim 1 further comprising, processing an alert or a notification sent from the mobile device in response to the mobile device evaluating the reformatted data.

6. The method of claim 1, wherein selectively obtaining further includes determining the data to obtain based on selections made by the operator of the mobile device via a mobile device interface that communicates with the method.

7. The method of claim 1, wherein selectively obtaining further includes pulling the data from the SST network repository using a native interface associated with the SST network repository.

8. The method of claim 1, wherein selectively obtaining further includes pulling the data from the SST network repository continuously at predefined intervals or based on an event.

9. The method of claim 8, wherein pulling further includes obtaining at least a portion of the data as real-time operational metrics for one or more SSTs that comprise an SST network.

10. The method of claim 9, wherein pulling further includes obtaining at least a portion of the data as incident or support information associated with one or more of the SSTs.

11. The method of claim 1, wherein reformatting further includes including an executable service with the reformatted data for delivery to the mobile device, the executable service when executed on the mobile device interprets and renders the reformatted data within one or more screens on the display of the mobile device.

12. A method, comprising:
presenting an interface to an operator of a mobile device;
receiving selections for data relevant to operational data gathered by a Self-Service Terminal (SST) network repository for SSTs that comprising a SST network, the selections made by the operator interacting with the interface and housing within the SST network repository SST specific data in SST specific data formats;
sending a configuration to an information delivery server that defines the selections, the information delivery server interacting with the SST network repository to obtain the selections for the data; and
rendering the data within one or more screens on a display of the mobile device as received back from the information delivery server and as defined by the operator and to screen locations within the display as defined by the operator.

13. The method of claim 12 further comprising, receiving alert or notification conditions from the operator interacting with the interface.

14. The method of claim 13 further comprising, evaluating the conditions against the data to automatically raise an alert or a notification to the information delivery server.

15. The method of claim 13 further comprising, evaluating the conditions against the data to automatically raise an alert or a notification to one or more of: a text message number, an email account, a social media account, a news feed, and a website portal.

16. The method of claim 12, wherein rendering further includes providing the rendered data within one or more of the screens as a dashboard service.

17. The method of claim 12, wherein rendering further includes providing the rendered data with a data interface and permitting the operator to interact with the data interface by interacting with the rendered data to obtain more detailed data, less detailed data, more detailed views of the data, and less detailed views of the data based on the original presented data within the screens.

18. The method of claim 12, wherein rendering further includes providing one or more geographical contextual views of the rendered data within the screens including a current location of the mobile device relative to the SST network and current locations for each of the SSTs within the SST network.

19. A system, comprising:
a server; and
a Self-Service Terminal (SST) network information manager configured and adapted to: i) execute on the server, ii) obtain SST operational data from a native SST network repository housing SST specific data in SST specific data formats, and iii) deliver selective portions of the operational data to a mobile device in real time or near real time in a mobile device compatible format and as defined by an operator of the mobile device and to screen locations within a display of the mobile device as defined by the operator.

20. The system of claim 19, wherein the SST network information manager is further adapted and configured to: iv) process an alert or a notification provided by the mobile device in response to the selective portions of the operational data.

* * * * *